United States Patent
McCall

(10) Patent No.: US 9,802,452 B1
(45) Date of Patent: Oct. 31, 2017

(54) GOOSENECK HITCH WITH DAMPENING ASSEMBLY AND KINGPIN ADAPTOR

(71) Applicant: B & W Custom Truck Beds, Inc., Humboldt, KS (US)

(72) Inventor: Travis M. McCall, Humboldt, KS (US)

(73) Assignee: B & W CUSTOM TRUCK BEDS, INC., Humboldt, KS (US)

(*) Notice: Subject to any disclaimer, the term of this patent is extended or adjusted under 35 U.S.C. 154(b) by 18 days.

(21) Appl. No.: 14/920,527

(22) Filed: Oct. 22, 2015

Related U.S. Application Data

(60) Provisional application No. 62/067,125, filed on Oct. 22, 2014.

(51) Int. Cl.
*B60D 1/24* (2006.01)
*B62D 53/08* (2006.01)

(52) U.S. Cl.
CPC ......... *B60D 1/249* (2013.01); *B62D 53/0842* (2013.01)

(58) Field of Classification Search
CPC ............................ B60D 1/249; B62D 53/0842
See application file for complete search history.

(56) References Cited

U.S. PATENT DOCUMENTS

| | | | |
|---|---|---|---|
| 2,416,502 A * | 2/1947 | Thompson | B60D 1/065 280/511 |
| 3,520,557 A * | 7/1970 | Gies | B62D 53/0878 188/268 |
| 3,528,345 A * | 9/1970 | Rumsey | F04C 2/101 418/196 |
| 4,147,376 A | 4/1979 | Slazas | |
| 5,240,270 A | 8/1993 | Colibert | |
| 6,416,073 B1 * | 7/2002 | Marcy | B60D 1/065 280/415.1 |
| 6,494,478 B1 * | 12/2002 | MacKarvich | B60D 1/06 177/136 |
| 6,540,246 B2 | 4/2003 | Andersen et al. | |
| 6,776,431 B1 | 8/2004 | Dick | |
| 6,808,195 B2 | 10/2004 | Smith | |
| 6,957,825 B2 | 10/2005 | Peters | |
| 6,971,660 B1 | 12/2005 | Putnam | |
| 7,000,937 B2 | 2/2006 | Dick | |
| 7,152,870 B2 | 12/2006 | Gurtler | |
| 7,530,591 B2 * | 5/2009 | Mater, Jr. | B60D 1/50 280/416.1 |
| 7,712,761 B2 * | 5/2010 | Mater, Jr. | B60D 1/249 280/416.1 |

(Continued)

*Primary Examiner* — Kevin Hurley
*Assistant Examiner* — Gabriela C Craciun
(74) *Attorney, Agent, or Firm* — Erickson Kernell IP, LLC

(57) ABSTRACT

A hitch with a force dampening assembly and a kingpin adapter. The hitch includes upper and lower arms coupled via a dampening assembly that includes a resilient member disposed in a passage in the lower arm and an axle coupled to the upper arm and disposed coaxially through the resilient member. Facets or asymmetries on the passage and axle resist rotational movement of the resilient member relative thereto. The resilient member is flexed between the wall of the passage and the axle to enable pivotal movement of the upper arm relative to the lower arm. The kingpin adapter includes a wedge ring disposed on a kingpin and retained thereon by a clamping ring. A housing is coupled to the clamping ring to affix the housing to a trailer and to retain the wedge ring in position. A hitch can be coupled to the housing.

20 Claims, 7 Drawing Sheets

(56) References Cited

U.S. PATENT DOCUMENTS

| | | |
|---|---|---|
| 7,775,544 B2 | 8/2010 | Bouwkamp |
| 9,114,680 B2 * | 8/2015 | Hartman ............ B62D 53/0814 |
| 2005/0263984 A1 | 12/2005 | Gurtler |
| 2008/0029996 A1 * | 2/2008 | Mater, Jr. ............... B60D 1/249 |
| | | 280/474 |

* cited by examiner

GOOSENECK HITCH WITH DAMPENING ASSEMBLY AND KINGPIN ADAPTOR

CROSS-REFERENCE TO RELATED APPLICATIONS

This application claims the benefit of U.S. Provisional Patent Application No. 62/067,125, filed Oct. 22, 2014 the disclosure of which is hereby incorporated herein in its entirety by reference.

BACKGROUND

Gooseneck and fifth-wheel hitch assemblies are well known and commonly used to couple a trailer to a tow vehicle. Gooseneck hitch assemblies generally couple to a hitch ball located in the bed of a tow vehicle, such as in a pick-up truck bed or on the bed of a flat-bed truck. The gooseneck hitch assembly includes an extension that extends from an underside of a forward end of the trailer to the hitch ball. The coupling between the gooseneck hitch assembly and the hitch ball allows rotational and pivotal movement of the trailer relative to the tow vehicle to accommodate turning of the vehicle and maneuvering over uneven terrain.

Fifth-wheel hitch assemblies are employed to accommodate similar towing applications to those of gooseneck hitch assemblies but operate somewhat differently. In a fifth-wheel hitch assembly, a kingpin is provided on the trailer extending downwardly from a forward end thereof. A fifth-wheel hitch is installed in or provided on the tow vehicle, such as in the bed of a pickup. The fifth-wheel hitch includes a receiver configured to accept the kingpin and to lockingly engage therewith. The fifth-wheel hitch enables relative rotational movement between the kingpin and hitch to accommodate turning of the vehicle. The fifth-wheel hitch may also enable pivotal movement of the trailer relative to the tow vehicle to accommodate uneven terrain.

A common drawback to towing trailers using gooseneck and fifth-wheel hitch assemblies is transfer of forces from the trailer to the tow vehicle that may cause the tow vehicle to buck or lurch forward and aft. The force transfer can be related to, for example, acceleration or deceleration of the tow vehicle that causes a bump or jerk to be felt by the tow vehicle occupants as the trailer moves slightly toward or away from the tow vehicle as allowed by flexure and/or coupler slack in the hitch assembly. A similar but generally cyclic bumping may also be encountered as the vehicle and trailer travel along a roadway due to a variety of forces acting on the tow vehicle and trailer. This force transfer can decrease the ride comfort of occupants in the tow vehicle and may decrease the stability and/or safety of the tow. A gooseneck hitch assembly configured to at least partially absorb or dampen relative movements between the trailer and tow vehicle would increase the comfort of tow vehicle occupants and would be an advantageous improvement in the art.

Another drawback of prior art designs is the restriction of trailer equipped with a kingpin to use with a fifth-wheel hitch. A hitch assembly that easily enables conversion of a kingpin-equipped trailer to a gooseneck-style hitch would be advantageous.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, ways to provide a gooseneck hitch with a force dampening assembly.

The force dampening assembly includes an upper arm that couples to a trailer and a lower arm that couples to a hitch ball in a tow vehicle. The upper and lower arms are coupled to one another to enable at least partial relative pivotal movement therebetween about an axis that is generally parallel to the surface over which the tow vehicle and trailer are traveling. The coupling between the upper and lower arms includes an outer shell and an axle disposed to extend coaxially within the outer shell. The outer shell is fixedly coupled to the upper arm or lower arm and the axle is fixedly coupled to the other of the arms. A resilient dampening element is disposed in a space between the outer shell and axle to resist relative coaxial rotation therebetween. The outer shell and axle are preferably faceted to resist relative movements between the dampening element and the outer shell and axle.

Embodiments of the invention also provide a kingpin-adaptor assembly for coupling a gooseneck hitch assembly to a kingpin-equipped trailer. The adaptor assembly includes a housing, a clamping ring, and a wedge ring. The wedge ring is comprised of a plurality of segments of an annular ring with an inner diameter dimensioned to be received in an annular groove on a kingpin. An outer diameter of the wedge ring includes a sloped or wedged surface that provides the wedge ring with an increasing diametrical dimension from a top axial end to a bottom axial end of the wedge ring. The clamping ring comprises an annular ring with an inner radial face configured with an oppositely sloped or wedged arrangement to that of the wedge ring such that the clamping ring can be installed around the wedge ring to retain the wedge ring in engagement with the groove in the kingpin. The housing provides an interior flange through which one or more fasteners can be inserted to couple with the clamping ring and to draw the clamping ring toward the interior flange in an axial direction. Thereby, a radially inwardly directed force is exerted on the wedge ring to retain engagement of the wedge ring with the groove in the kingpin. The housing is thus held in engagement with the kingpin and trailer via engagement with the clamping ring and provides a mounting location to which a gooseneck hitch can be coupled.

DESCRIPTION OF THE DRAWINGS

Illustrative embodiments of the invention are described in detail below with reference to the attached drawing figures, and wherein.

DETAILED DESCRIPTION

Figure 1:
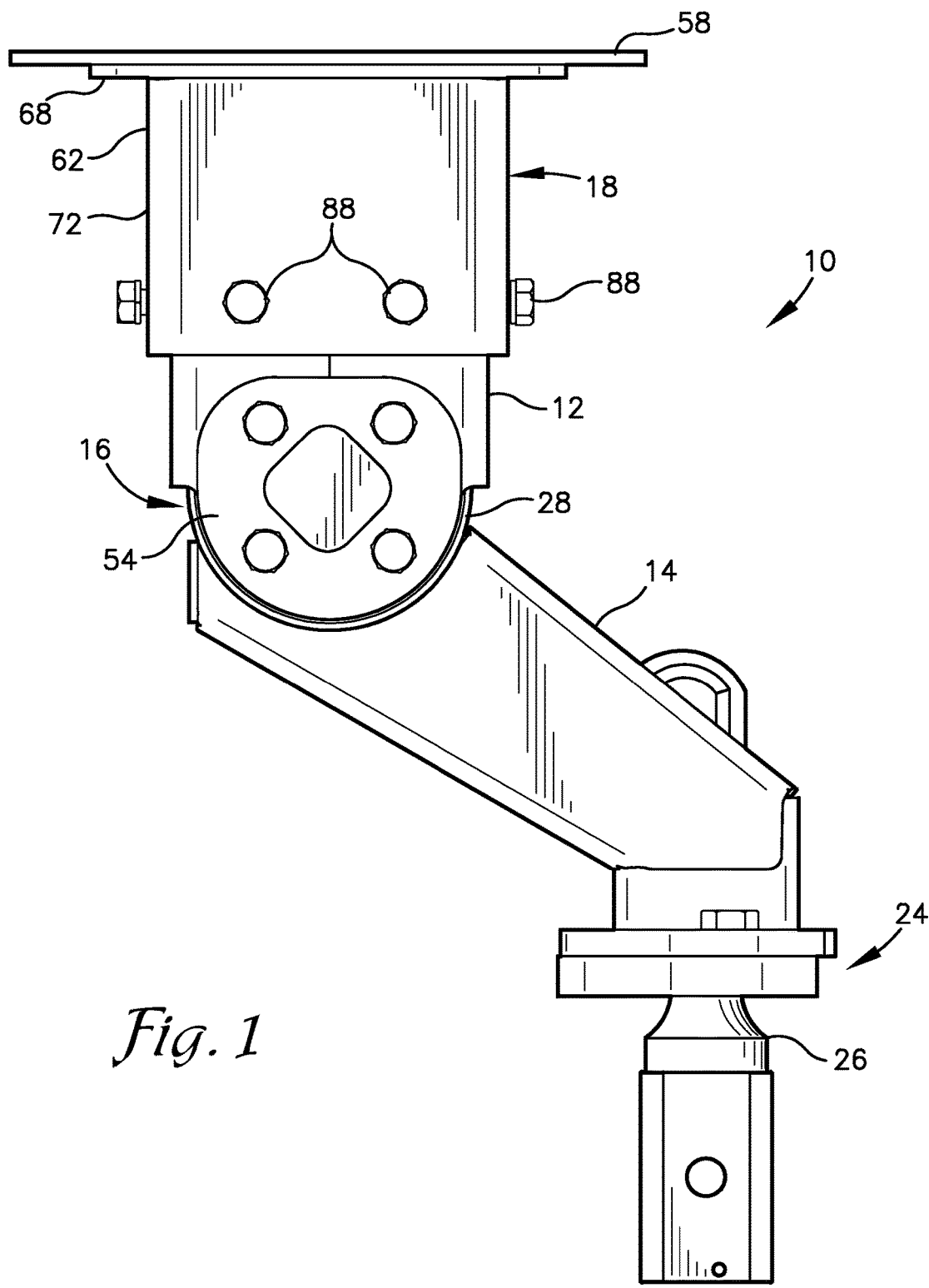
FIG. 1 is a elevational side view of a gooseneck hitch with a force dampening assembly and a kingpin adapter assembly depicted in accordance with an embodiment of the invention.
Figure 2:
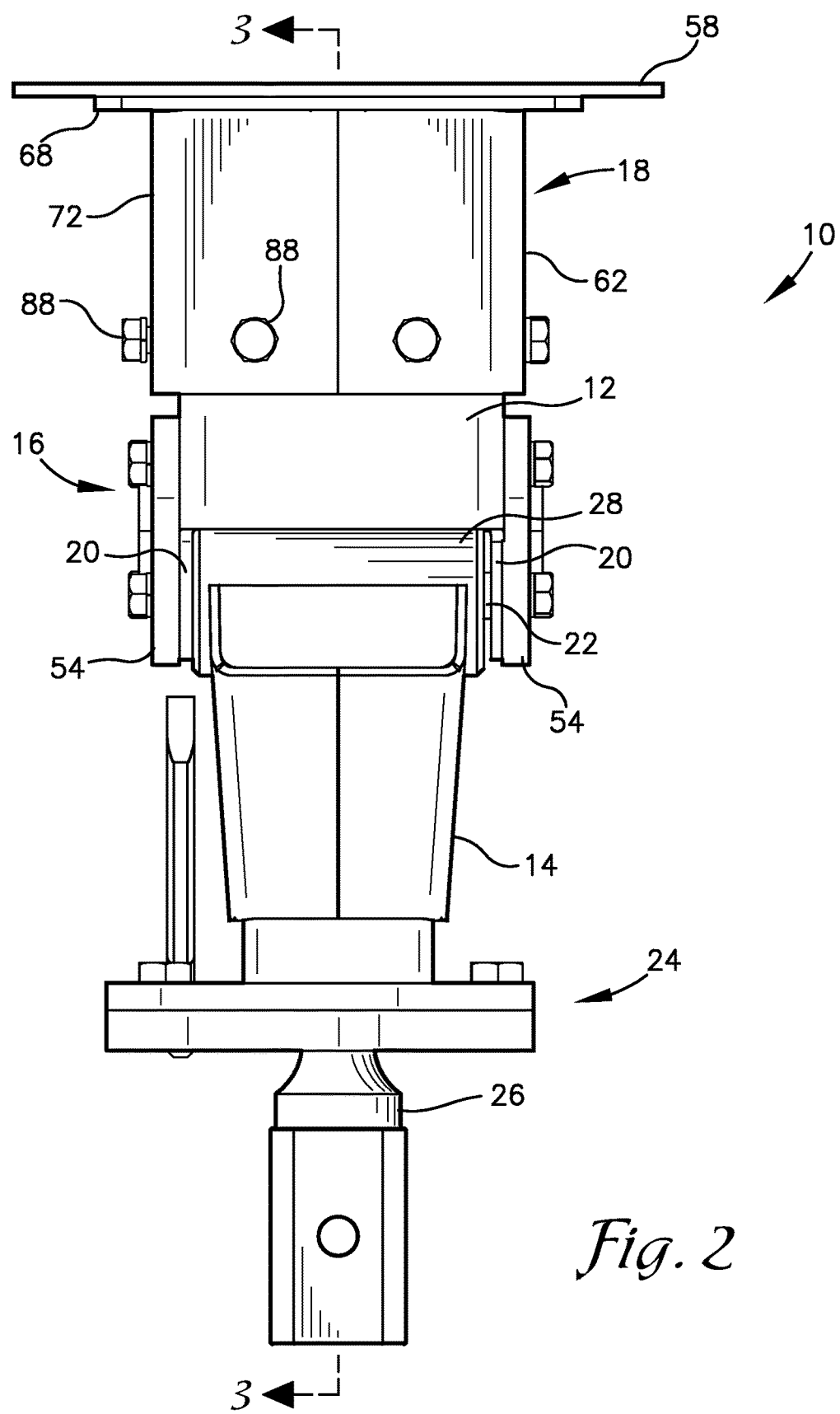
FIG. 2 is a rear elevational view of the gooseneck hitch and kingpin adapter assembly of FIG. 1.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

With reference now to FIGS. 1-5, a gooseneck hitch 10 is described in accordance with an embodiment of the invention. The hitch 10 comprises an upper arm 12 that is pivotably coupled to a lower arm 14 by a torsional dampening assembly 16. The upper arm 12 of the embodiment shown includes a tubular body with a first end coupled to a king-pin adapter assembly 18 coupled to a trailer 58 to be towed as described more fully below. It is to be understood that the upper arm 12 may be coupled directly to the trailer to be towed or coupled to the trailer by other means. The first end can be configured to couple directly to a frame or body of the trailer or to a gooseneck adapter, such as a tube or pipe extending from the trailer. The coupling with the trailer may be fixed and/or generally permanent, e.g. bolted or welded in place, or may be readily removable, such as by use of a pin inserted through apertures in the upper arm 12 and an adapter on the trailer. The body of the upper arm 12 is shown and described as comprising a generally square tube, however tubes or bodies of other cross-sections may be employed, e.g. cylindrical.

Figure 5:
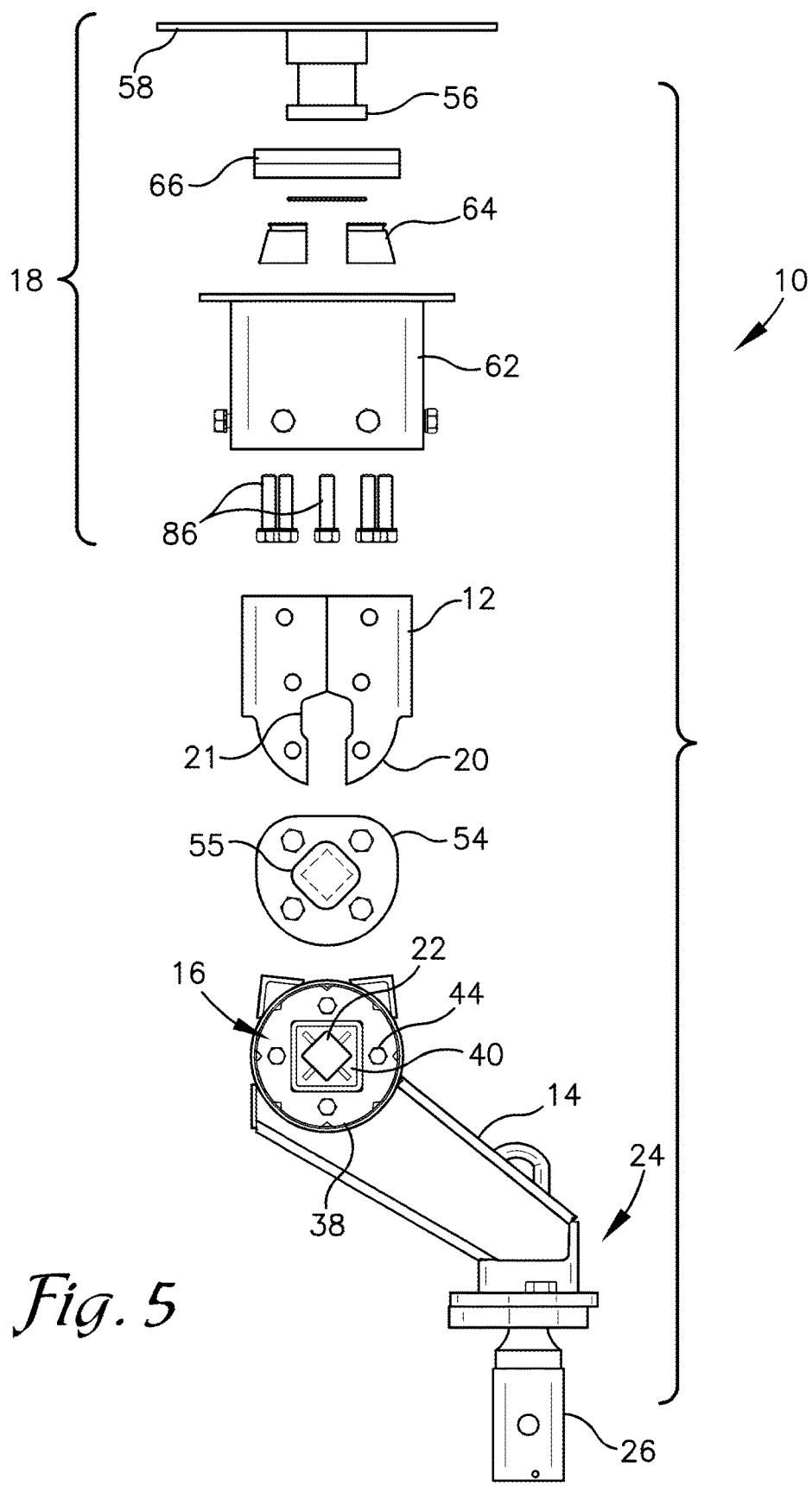
FIG. 5 is an exploded view of the gooseneck hitch and kingpin adapter assembly of FIG. 1.

An opposite, second end of the upper arm 12 includes a pair of flanges 20 depending from opposite sides of the arm 12, e.g. extending parallel to and generally coplanar with a respective side of the upper arm 12 as shown in FIG. 5. The flanges 20 include an aperture or slot 21 configured to receive an axle 22 of the torsional dampening assembly 16. The slots 21 may be configured to engage the axle 22 to prevent rotational motion of the axle 22 relative to the upper arm 12. In one embodiment the axle 22, which may be formed as a metal bar of square cross-section, is fixedly coupled to one or both of the flanges 20, such as by welding.

The lower arm 14 comprises a generally hollow elongate body with a receiver assembly 24 for coupling to a hitch ball 26 disposed at a first end thereof. The receiver assembly 24 and the hitch ball 26 are of a common design known in the art and are thus not further described in detail herein.

A second, opposite end of the lower arm 14 includes a cylindrical housing or sleeve 28 disposed with a central axis thereof extending orthogonally to the length of the lower arm 14 and generally transversely to the length of a trailer to which the hitch 10 may be coupled. One or more interior flanges 30 are provided extending across one or more diametrical planes within the cylindrical housing 28. The interior flange 30, in the embodiment shown, includes a central aperture 32 having a polygonal, faceted, or asymmetrical perimeter and may include one or more fastener bores 34 extending therethrough. In another embodiment, the central aperture 32 may include a generally annular perimeter with one or more ribs, teeth, radially extending slots, or the like disposed about the perimeter. The fastener bores 34 may be threaded to enable threaded coupling with a fastener.

Figure 3:
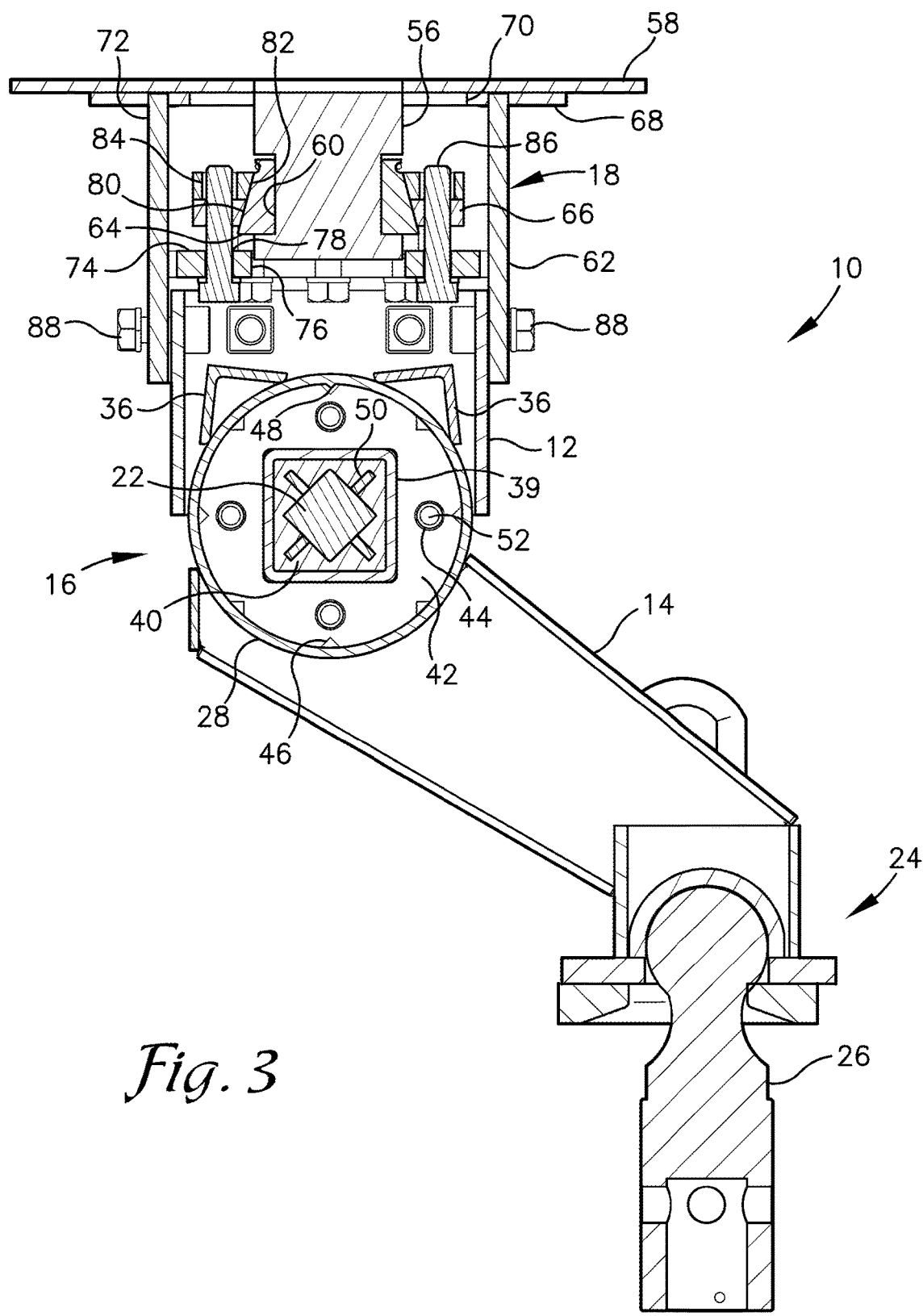
FIG. 3 is a cross-sectional view of the gooseneck hitch and kingpin adapter assembly of FIG. 1 taken along the line 3-3 depicted in FIG. 2.

One or more stop plates 36 may be included on an exterior surface of the cylindrical housing 28. As depicted in FIG. 3, the stop plates 36 comprise sections of angle or L-shaped bar that are welded to the exterior surface of the cylindrical housing 28 but may comprise other shapes such as flanges, tabs, protuberances, or the like. In another embodiment, the stop plates 36 are not included in the hitch 10. The stop plates 36 are positioned and configured to interfere with or obstruct at least a portion of a range of pivotal movement between the upper arm 12 and lower arm 14 as described below. The stop plates 36 may be positioned interior or exterior to the upper arm 12 when the upper and lower arms 12, 14 are coupled together. As depicted in FIG. 3, the stop plates 36 lie inside the body of the upper arm 12 when the upper and lower arms 12, 14 are coupled together. The stop plates 36 thus contact an interior surface of the upper arm 12 when the lower arm 14 is pivoted relative to the upper arm 12 to define or limit the range of motion available to the lower arm 14.

Figure 4:
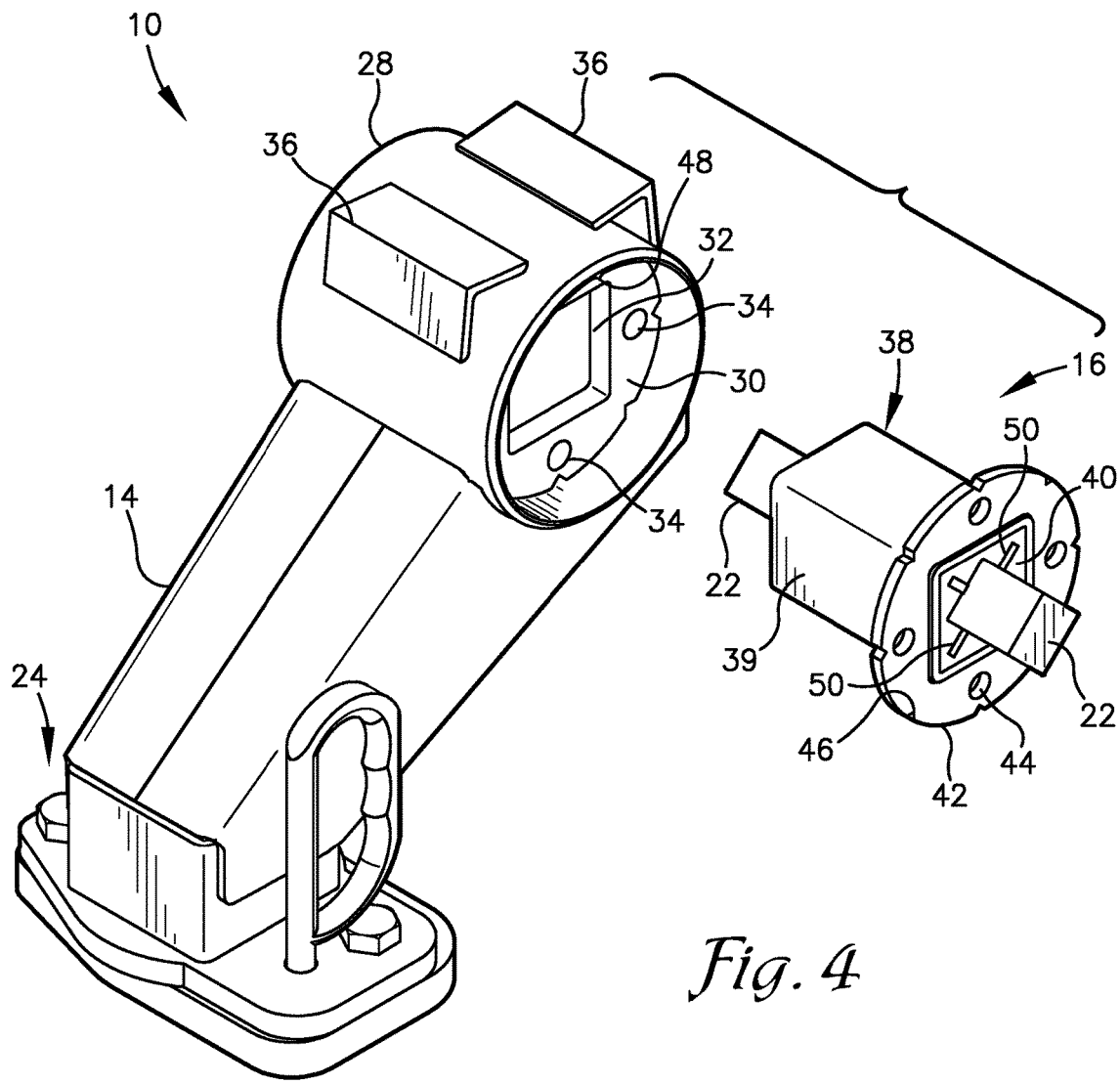
FIG. 4 is a perspective view of a lower arm of the gooseneck hitch of FIG. 1 that is partially exploded to depict a torsional dampening assembly in accordance with an embodiment of the invention.

The torsional dampening assembly 16 comprises an outer body 38 and a resilient member 40. The outer body 38 includes an elongate hollow section or sleeve 39 configured to be received in the central aperture 32 of the cylindrical housing 28 on the lower arm 14. The outer body 38 and the central aperture 32 are preferably dimensioned to provide a close fit therebetween such that the outer body 38 is held substantially rigidly therein. The perimeter of the central aperture 32 and the outer body 38 are also configured to prevent rotational movement of the outer body 38 within the central aperture 32. For example, as depicted in FIG. 4, the perimeter of the central aperture 32 and of the hollow section 39 of the outer body 38 have a polygonal or faceted configuration (square in the embodiment shown) that obstructs rotational movements therebetween.

The outer body 38 may include an annular flange 42 extending radially outward near or at one end thereof that includes one or more bores 44 in the annular flange 42 that are positioned to align with the fastener bores 34 in the interior flange 30 of the lower arm 14. One or more indentations or notches 46 can be provided along the perimeter of the annular flange 42 to align with corresponding ridges 48 provided on the interior surface of the cylindrical housing 28. The engagement of the notches 46 with the ridges 48 may aid to properly align the outer body 38 with the cylindrical housing 28 and/or to resist rotational movement therebetween.

The resilient member 40 comprises a rubber, plastic, composite, or other material or combination thereof that is at least partially deformable but that is sufficiently resilient to return to an original state after deformation. The resilient member 40 includes a central bore 50 extending therethrough that is dimensioned to receive the axle 22. An exterior surface of the resilient member 40 is dimensioned to be received within the hollow section 39 of the outer body 38. The dimensions of the member 40 may be configured to provide an at least partial friction-fit between the member 40 and one or both of the outer body 38 and the axle 22. As such, the resilient member 40 is configured to substantially fill a space between the axle 22 and the interior of the outer body 38 when the axle 22 is inserted therein. In another embodiment, the resilient member 40 is formed in the hollow section 39 of the outer body 38 around the axle 22, e.g. the resilient member 40 may be formed by pouring uncured or partially cured resilient material in the hollow section 39 around the axle 22 and then allowing the material to cure.

Figure 7:
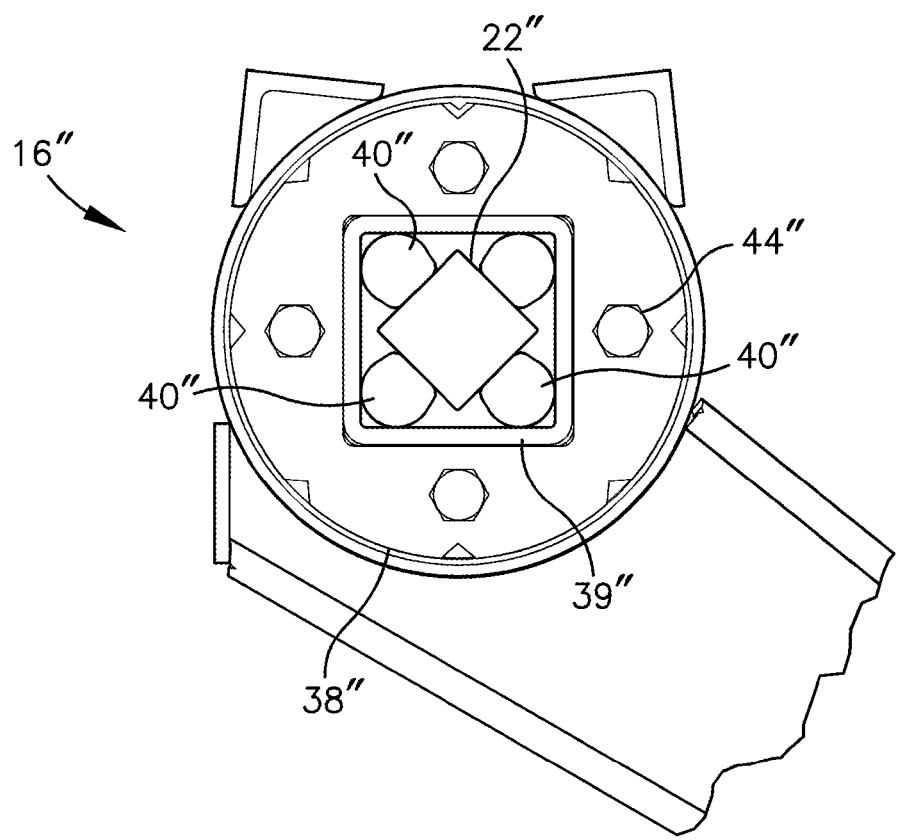
FIG. 7 is a side elevational view of a torsion dampening assembly that includes a plurality of resilient elements disposed about an axle depicted in accordance with another embodiment of the invention.

As depicted in FIG. 7, in another embodiment the resilient member 40" of a torsional dampening assembly 16" comprises a plurality of members 40" disposed between facets of the axle 22" and the interior surface of the outer body 38". The resilient members 40" may have any desired cross-sectional form and may be at least partially compressed between the outer body 38" and the axle 22". The resilient members 40" might also be configured with a cross-sectional form configured to conform to the interior surface of the outer body 38" and/or the facets of the axle 22".

Returning to FIGS. 1-5, the resilient member 40 resists rotational movement relative to the axle 22, and to the outer body 38 but at least partially flexes to enable pivotal movement of the axle 22 relative to the outer body 38. The faceted or asymmetrical perimeter of the hollow section 39 of the outer body 38 resists rotational movement of the resilient member 40 relative to the outer body 38. The axle 22 is also provided with one or more facets, asymmetries, flanges, protuberances, teeth, ridges, or the like to similarly resist rotation of the axle 22 relative to the resilient member 40. As depicted, in FIGS. 3-4 the axle 22 has a square or polygonal cross-sectional profile and includes a vane 50 extending radially outwardly from each face of the square profile.

The vanes 50 further act to engage the resilient member 40 and resist rotational movement of the axle 22 relative thereto. The vanes 50 may be included on each face of the axle 22 or only on select ones of the facets. The vanes 50 may also take any desired form and may extend along all or a portion of the axial length of the axle 22. For example, the vanes 50 may be planar as shown in FIGS. 3-4, or might take an arcuate, angled, or other arrangement.

The upper arm 12 and lower arm 14 are coupled together via the dampening assembly 16. The dampening assembly 16 is installed in the cylindrical housing 28 by inserting the hollow section 39, with the resilient member 40 and axle 22 disposed therein, into the central aperture 32 of the interior flange 30. One or more fasteners 52 are installed in the aligned bores 34, 44 to connect the outer body 38 to the flange 30 of cylindrical housing 28. The axle 22 extends from each side of the cylindrical housing 28 a distance sufficient to engage the slots 21 in the flanges 20 of the upper arm 12. A retaining plate 54 is coupled to each of the flanges 20 on the upper arm 12 to retain the axle 22 against axial movement and in engagement with the flanges 20. The retaining plates 54 may include receiver spaces 55 or depressions therein that are configured to receive a respective end of the axle 22. The receiver spaces 55 include a perimeter matching that of the axle 22 or configured to capture the axle 22 therein in a non-rotational engagement relative to the retaining plates 54 and the upper arm 12.

Although the hitch 10 is described herein with the dampening assembly 16 disposed within the lower arm 14, other configurations may be employed without departing from the scope of embodiments of the invention described herein. For example, the orientation of the components might be reversed such that the cylindrical housing 28 is formed as part of the upper arm 12 and the lower arm 14 provided with the flanges 20 to engage the axle 22.

Figure 6:
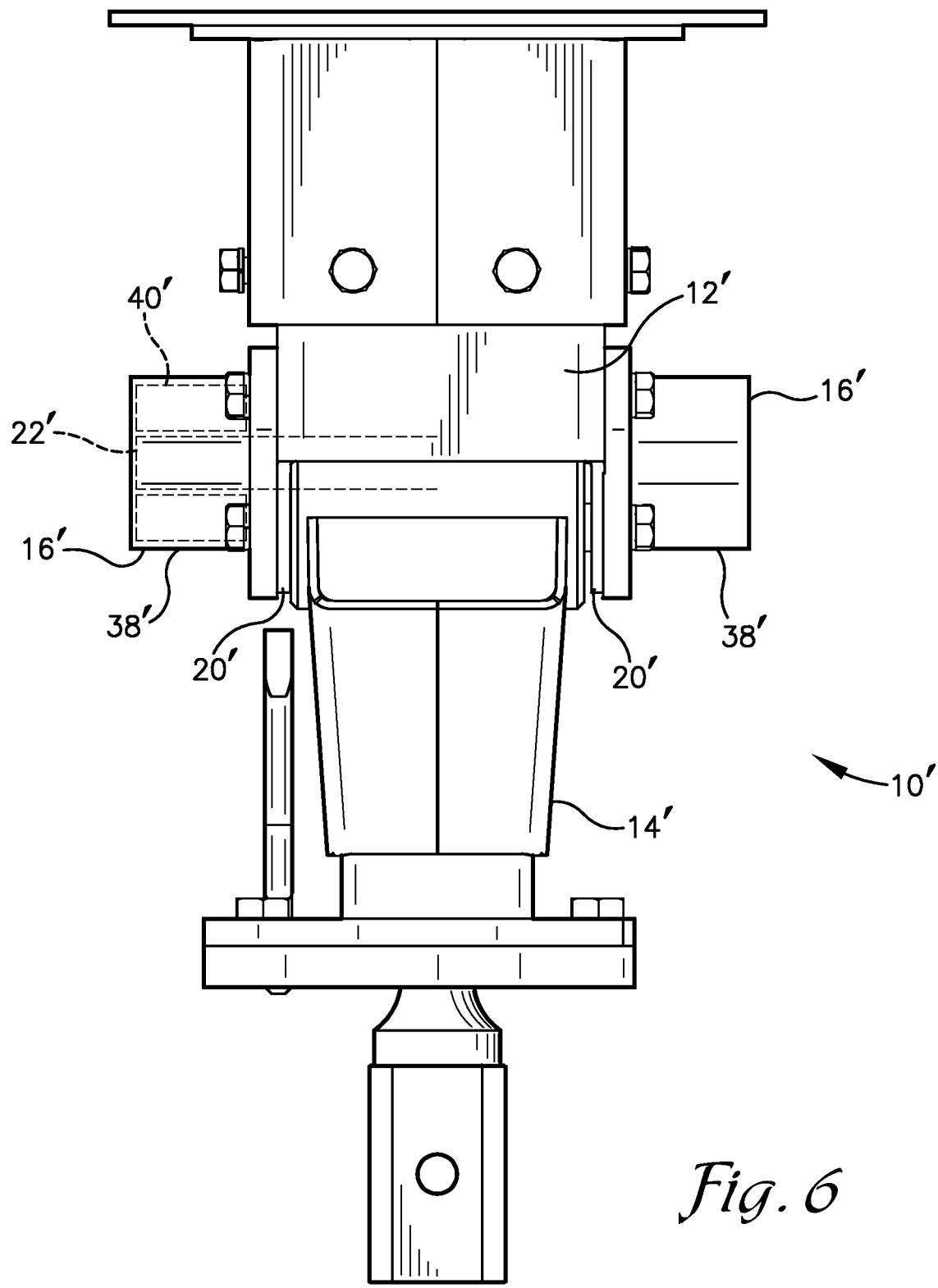
FIG. 6 is a rear elevational view of a gooseneck hitch with an exteriorly mounted force dampening assembly showing a portion of an axle and a resilient member in phantom and depicted in accordance with an embodiment of the invention.

In another embodiment shown in FIG. 6, the dampening assembly is provided externally to upper and lower arms 12', 14'. For example, a pair of dampening assemblies 16' may be coupled to the exterior of a hitch 10' on opposite transverse sides thereof. The axle 22' may be coupled to the lower arm 14' and configured to extend a distance beyond the flanges 20' of the upper arm 14' to engage a resilient member which is housed in an outer body 38' that is coupled to the exterior of the upper arm 12'. The resilient member 40 may also comprise a spring, such as a coil spring mounted around the axle 22 and connected between the axle and the outer body 38 or springs mounted in dampening assemblies coupled on the outer sides of the flanges 20.

In operation, the hitch 10 aids to dampen force transference between the trailer and tow vehicle by at least partially flexing at the dampening assembly 16. The flexure of the resilient member 40 allows the axle 22 coupled to the upper arm 12 to at least partially rotate relative to the outer body 38 of the dampening assembly 16, which is coupled to the lower arm 14. The upper arm 12 can thereby pivot relative to the lower arm 14 to at least partially absorb or dampen forces between the trailer and tow vehicle. The range of pivotal motion provided between the upper and lower arms 12, 14 is limited by the stop plates 36 contacting sidewalls of the upper arm 12 and obstructing such movements.

The hitch 10 may also aid to increase the clearance distance between the cab of the tow vehicle and the front end of the trailer being towed. Available gooseneck-style hitches and trailers typically employ a vertically aligned tube or similar component extending from the trailer downward to the bed of the tow vehicle and the hitch ball 26 disposed thereon. This configuration places an attachment point between the hitch and the trailer in vertical alignment with the coupling between the hitch and the hitch ball. In contrast, embodiments of the hitch 10 move the attachment point between the hitch 10 and the trailer longitudinally rearward and offset from the coupling with the hitch ball 26. As such, the front end of the trailer is moved further rearward to increase the clearance between it and the cab of the tow vehicle. Additional clearance may increase the angular range available to the tow vehicle for turning relative to the trailer, such as during backing of the trailer, among other benefits.

With reference again to FIG. 3, the kingpin adapter assembly 18 is described in accordance with an embodiment of the invention. As described previously, the hitch 10 can be employed and configured for use with the kingpin adapter assembly 18 to enable coupling of the hitch 10 to a trailer having a kingpin 56 extending from a support panel 58 on an underside thereof. The kingpin 56 includes a cylindrical body having an annular groove 60 near a distal end as known in the art.

The kingpin adapter assembly 18 comprises a housing 62, a wedge ring 64, and a clamping ring 66. The housing 62 includes a base plate 68 with a centrally located opening 70 and an outer or peripheral wall 72 extending perpendicularly from the base plate 68 between the perimeter of the opening and an outer edge of the base plate 68. The opening 70 has dimensions suitable to receive the kingpin 56, wedge ring 64, and clamping ring 66 therethrough such that the base plate 68 is in contact with the panel 58 of the trailer and the kingpin 56 is positioned interior to the wall 72 of the housing 62. The housing 62 also includes a transverse wall 74 spanning across an interior space in the housing 62 formed by the wall 72 and spaced apart from the base plate 68. The transverse wall 74 may include an aperture 76 that can at least partially receive the kingpin 56 therethrough. A plurality of bores 78 are provided in the transverse wall 74 spaced about the perimeter of the aperture 76.

The wedge ring 64 comprises an annular ring formed from a plurality of arcuate segments, preferably two or three segments for ease of use. An inner diameter of the wedge ring 64 is approximately equal to or just greater than that of the groove 60 in the kingpin 56 and an axial length or height of the wedge ring 64 is less than that of the groove 60. As such, the segments of the wedge ring 64 can be placed in the groove 60 to form a substantially continuous annulus surrounding the kingpin 56. An outer face 80 of the wedge ring 64 is angled outward and downward relative to an axis of the ring 64 to provide a downwardly sloped or wedged surface. The angle of the outer face 80 is positioned to provide a smaller radial dimension near a top of the wedge ring 64 and a larger radial dimension near the bottom.

The clamping ring 66 comprises an annular ring having a plurality of axially aligned bores 80 disposed about the circumference thereof. An inner face 82 of the clamping ring 66 is configured with an oppositely sloped or wedged arrangement to that of the outer face 80 of the wedge ring 64 and includes a minimum diameter that is less than a maximum diameter of the wedge ring 64.

Installation of the kingpin adapter assembly 18 on a trailer is now described in accordance with an embodiment of the invention. The clamping ring 66 is initially installed around the kingpin 56 and maintained above the annular groove 60 therein. The segments of the wedge ring 64 are disposed in the annular groove 60 of the kingpin 56 and the clamping ring 66 lowered to bring the inner face 82 of the clamping ring 66 into contact with the outer face 80 of the wedge ring and to thereby capture the wedge ring 64 between the clamping ring 66 and the kingpin 56. The housing 62 is installed around the kingpin 56 by receiving the kingpin 56 with the wedge ring 64 and clamping ring 66 installed thereon through the opening 70 in the base plate 68. The base plate 68 is pressed into contact with the support panel 58 or underside of the trailer. A plurality of fasteners 86 are installed in the bores 78 in the transverse wall 74 of the housing and the bores 84 in the clamping ring 66 to couple the housing 62 to the clamping ring 66. The fasteners 86 are tightened to draw the clamping ring 66 toward the transverse wall 74 of the housing 62 and thus to apply a radially inward force on the wedge ring 64.

Tightening the fasteners 86 also draws the base plate 68 of the housing 62 against the panel 58 of the trailer. The wedge ring 64 is thereby retained in engagement with the kingpin 56 and the housing 62 is retained in a fixed engagement with the trailer. A hitch, such as the hitch 10, another gooseneck hitch, or a hitch of another configuration can be coupled to the outer wall 72 of the housing 62 via one or more fasteners 88, among other methods.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A hitch assembly comprising:
    an upper arm having a first end configured to couple to a trailer;
    a lower arm having a first end configured to couple to a tow vehicle;
    a torsional dampening assembly operatively disposed between and pivotally coupling a second end of the upper arm and a second end of the lower arm, the upper arm being at least partially pivotal relative to the lower arm about an axis extending through the torsional dampening assembly; and
    a kingpin adaptor assembly that couples the upper arm to the trailer, the kingpin adaptor assembly including a wedge ring disposed in an annular groove in a kingpin on the trailer and including a sloped outer circumferential face, and a clamping ring having an annular body with a sloped inner circumferential face, the sloped outer face of the wedge ring being at least partially received within an interior opening of the clamping ring and against the sloped inner face of the clamping ring.

2. The hitch assembly of claim 1, wherein the torsional dampening assembly includes a resilient element that biases the upper arm toward a predetermined orientation relative to the lower arm.

3. The hitch assembly of claim 2, further comprising:
    an axle non-rotatably coupled to one of the second end of the upper arm and the second end of the lower arm and disposed to engage the resilient element.

4. The hitch assembly of claim 3, wherein the axle includes one or more facets that resist rotational movements of the axle relative to the resilient element.

5. The hitch assembly of claim 3, wherein the axle includes one or more projections extending outwardly from a surface thereof and into the resilient element.

6. The hitch assembly of claim 2, wherein one of the second end of the upper arm and the second end of the lower arm includes a transverse passage in which the resilient element is disposed.

7. The hitch assembly of claim 6, wherein the transverse passage includes an interior surface and the resilient element fills a space between the interior surface and the axle.

8. The hitch assembly of claim 6, wherein the transverse passage includes a perimeter with at least one facet that resists rotational movements of the resilient element relative to the transverse passage.

9. The hitch assembly of claim 2, wherein the resilient element at least partially flexes to enable at least partial pivotal movement between the upper arm and the lower arm.

10. The hitch assembly of claim 1, wherein one or more of the upper arm and the lower arm include a stop plate, the stop plate limiting a range of pivotal motion between the upper arm and the lower arm.

11. The hitch assembly of claim 1, wherein the kingpin adaptor assembly further includes:
a housing that includes a base, a wall, and an interior flange, the base abutting a surface of the trailer, the wall extending from the base and coupling to the upper arm, the interior flange extending from an interior surface of the wall generally parallel to and spaced apart from the base, the interior flange being coupled to the clamping ring, coupling of the interior flange with the clamping ring drawing the base toward the surface of the trailer and drawing the clamping ring toward the interior flange and thereby applying a radially inward force on the wedge ring.

12. A hitch assembly comprising:
a first member;
a second member, a first end of one of the first member and the second member being coupled to a trailer, and a first end of the other of the first member and the second member being coupled to a tow vehicle;
a torsional dampening assembly including an axle that is coupled to a second end of the first member and a resilient element disposed between the axle and a second end of the second member, the resilient element flexing to enable pivotal motion of the first member relative to the second member about the axle; and
a kingpin adaptor assembly that couples the upper arm to the trailer, the kingpin adaptor assembly including a wedge ring disposed in an annular groove in a kingpin on the trailer and including a sloped outer circumferential face, and a clamping ring having an annular body with a sloped inner circumferential face, the sloped outer face of the wedge ring being at least partially received within an interior opening of the clamping ring and against the sloped inner face of the clamping ring.

13. The hitch assembly of claim 12, wherein the second end of second member includes a passageway extending therethrough transversely to the direction of travel of the tow vehicle, the axle extends substantially coaxially through the passageway, and the resilient element fills a space between an interior surface of the passageway and the axle.

14. The hitch assembly of claim 12, wherein the axle extends beyond an outer surface of the first member, and wherein the resilient element is positioned to extend at least partially beyond an outer surface of the second member and is engaged by the axle at a location beyond the outer surface of the second member.

15. The hitch assembly of claim 12, wherein the first member includes a wall that defines a slot through which the axle extends and includes a retaining plate coupled to the wall and engaging an end of the axle, the retaining plate preventing movement of the axle relative to the first member.

16. A hitch assembly, the assembly comprising:
a wedge ring formed from a plurality of annular segments, the wedge ring including an inner circumferential face configured to be disposed in an annular groove in a kingpin and a sloped outer circumferential face;
a clamping ring having sloped inner circumferential face, the sloped inner circumferential face being configured to at least partially receive the sloped outer circumferential face of the wedge ring;
a housing that includes an interior flange;
a coupling between the interior flange and the clamping ring, the coupling drawing the clamping ring toward the interior flange and thereby applying a radially inward force on the wedge ring that retains the wedge ring in the groove in the kingpin; and
a first hitch member coupled to the housing.

17. The hitch assembly of claim 16, wherein the clamping ring includes a plurality of axially aligned bores extending therethrough, the interior flange includes plurality of apertures that are aligned with the bores in the clamping ring, and wherein the coupling comprises a fastener installed in each aperture in the interior flange to extend to a respective bore in the clamping ring to couple the clamping ring and the housing.

18. The hitch assembly of claim 16, wherein the housing includes a generally planar base with a wall extending from a surface thereof to form an open ended enclosure, the interior flange extending from an interior surface of the wall and being substantially parallel to and spaced apart from the base, wherein the base includes an aperture through which the kingpin can be inserted into an interior space defined by the base, the wall, and the interior flange, and wherein the first hitch member is coupled to a distal end of the wall.

19. The hitch assembly of claim 16, further comprising:
a second hitch member having a first end configured to couple to a tow vehicle;
an axle fixedly coupled to a distal end of the first hitch member;
a resilient element disposed in a second end of the second hitch member, the axle being engaging the resilient element, the resilient element enabling pivotal movement of the first hitch member relative to the second hitch member about the axle.

20. The hitch assembly of claim 16, further comprising:
a second hitch member having a first end configured to couple to a tow vehicle;
an axle fixedly coupled to a second end of the second hitch member;
a resilient element disposed in a distal end of the first hitch member, the axle engaging the resilient element, the resilient element enabling pivotal movement of the first hitch member relative to the second hitch member about the axle.

* * * * *